United States Patent [19]

LoSasso

[11] Patent Number: 6,096,847
[45] Date of Patent: Aug. 1, 2000

[54] LOW MOLECULAR WEIGHT STRUCTURED POLYMER DISPERSANTS

[76] Inventor: Janice E. LoSasso, 7 Waterford La., Savannah, Ga. 31411

[21] Appl. No.: 08/926,665

[22] Filed: Sep. 9, 1997

Related U.S. Application Data

[63] Continuation of application No. 08/577,524, Dec. 22, 1995, abandoned.

[51] Int. Cl.$^7$ .......................... C08F 228/02; C08F 220/04
[52] U.S. Cl. .......................... 526/287; 526/261; 526/271; 526/307; 526/318.43
[58] Field of Search ..................................... 526/287, 261, 526/271, 307, 323.1

[56] References Cited

U.S. PATENT DOCUMENTS

| | | | |
|---|---|---|---|
| 3,199,589 | 8/1965 | Boyd | 526/306 |
| 3,463,730 | 8/1969 | Booth | 210/58 |
| 3,709,815 | 1/1973 | Boothe | 210/58 |
| 3,770,490 | 11/1973 | Parker . | |
| 3,898,037 | 8/1975 | Lange | 21/2.7 R |
| 4,711,725 | 12/1987 | Amick | 210/701 |
| 4,929,717 | 5/1990 | Chmelir | 526/317.1 |
| 4,950,725 | 8/1990 | Flesher | 526/307.6 |
| 5,171,808 | 12/1992 | Ryles | 526/264 |
| 5,424,259 | 6/1995 | Yordan | 501/146 |

FOREIGN PATENT DOCUMENTS

| | | | |
|---|---|---|---|
| 2046688 | 1/1992 | Canada . | |
| 0 374 458 | 6/1990 | European Pat. Off. | C08F 220/54 |
| 1324139 | 7/1973 | United Kingdom | C08F 3/42 |

*Primary Examiner*—Christopher Henderson
*Attorney, Agent, or Firm*—Fish & Neave; John M. Hintz; Lisa A. Dixon

[57] ABSTRACT

The present invention relates to novel low molecular weight, structured polymer compositions. The invention also relates to methods for inhibiting scale formation, precipitation or deposition; increasing dispersion of insoluble precipitates in process waters; treating cooling and boiler water; and reducing the viscosity of mineral slurries using the aforementioned polymer compositions.

6 Claims, No Drawings

6,096,847

LOW MOLECULAR WEIGHT STRUCTURED POLYMER DISPERSANTS

This is a continuation of application Ser. No. 08/577,524, filed Dec. 22, 1995, now abandoned entitled LOW MOLECULAR WEIGHT STRUCTURED POLYMERS.

TECHNICAL FIELD OF THE INVENTION

The present invention relates to novel low molecular weight, structured polymer compositions. The invention also relates to methods for inhibiting scale formation, precipitation or deposition; increasing dispersion of insoluble precipitates in process waters; treating cooling and boiler water; and reducing the viscosity of mineral slurries using the aforementioned polymer compositions.

BACKGROUND OF THE INVENTION

Industrial and residential waters contain naturally occurring contaminates (i.e., calcium, iron, barium, bicarbonate, carbonate, oxide, oxylate, sulfate, phosphate, zinc, etc.) that under conditions of use can chemically combine to form water insoluble precipitates. Additionally, water insoluble contaminates such as clay, silica and iron oxides can settle out of the water. These precipitates and inert materials can collect on surfaces of containers and piping in the form of deposits and scales which reduce heat transfer, inhibit flow, increase likelihood of corrosion and enhance bacterial growth. In mining applications, compositions which aid in fluidizing insoluble particulates are desirable in order to more efficiently procure and transport the mined materials.

Current mechanisms for controlling scale and deposits involve preventing formation of insoluble precipitates (e.g., limiting crystal growth) or keeping inert insoluble materials dispersed in the system. Dispersants fluidize precipitates, silts, solids and combinations thereof. Chelants or sequestering agents can be used to bind cations to help prevent the formation of insoluble precipitates. Surface active agents can be used to aid in the dispersion of inert clays and silica. By nature, some of these agents may also be useful in fluidizing high solids slurries of ores and minerals.

Certain low molecular weight organic polymers (less than 100,000 MW) are capable of both inhibiting precipitation and keeping insoluble contaminates dispersed. These polymers are comprised of polycarboxylic and polysulfonic acids and their salts, copolymers of these acids, and co- and interpolymers of these acids with acrylamide, cationic monomers, vinyl esters and ethers.

In U.S. Pat. No. 3,463,730, Booth and Mead describe a process for controlling or preventing scale deposits in aqueous systems by addition of a low molecular weight (1,000–8,000) unhydrolyzed polyacrylamide. Booth and Cornelius, in U.S. Pat. No. 3,709,815 disclose polymers containing 2-acrylamido-2-substituted propane-1-sulfonic acid with an average molecular weight of at least 20,000 for use as boiler water dispersives and conditioners. In U.S. Pat. No. 3,898,037, Lange et al., describe polymers and co-polymers of acrylamido-sulfonic acid used in dispersing water-insoluble compounds of iron, calcium, magnesium, aluminum and commonly occurring particles of silt and clay. Amick et al., in U.S. Pat. No. 4,711,725, disclose a variety of copolymers, terpolymers and interpolymers also utilzed for these applications. In each patent, the polymers described are linear in structure and completely water-soluble.

Low molecular weight organic polymers that are linear and water soluble have also been disclosed to fluidize or disperse minerals in high concentration slurries. This allows more economical storage and transport forms of the minerals. Amick et al., in U.S. Pat. No. 4,711,725 demonstrates the abilities of co- and terpolymers of carboxylic and sulfonic acids to reduce the viscosity of clay and calcium carbonate slurries. Again, these polymer compositions have a linear structure and are water soluble.

Structured, high molecular weight polymers have been previously disclosed. Ryles et al., in U.S. Pat. No. 5,171,808, disclose cross-linked, anionic or amphoteric, organic, polymeric microparticles for use in flocculating dispersions of suspended solids. In European Patent Application 0 374 458, Neff et al. disclose water-soluble, branched polymeric flocculants based on polymerization of ethlyenically unsaturated monomers and branching agents in the presence of a chain-transfer agent. Both of these patents disclose compositions of high molecular weight polymers used as flocculating agents, and used to induce massing and precipitation of insoluble materials rather than dispersion of insoluble materials in a multiphase system.

While the aforementioned compositions utilized as scale inhibitors and dispersants may be applicable under specific conditions, they are only moderately effective or ineffective under certain circumstances. Therefore, a need exists for alternative compositions and methods for inhibiting scale formation, precipitation or deposition; increasing dispersion of insoluble precipitates in process waters; treating cooling and boiling water; and reducing the viscosity of mineral slurries.

SUMMARY OF THE INVENTION

This invention provides novel low molecular weight structured polymer compositions comprising ethylenically unsaturated monomers and structure-inducing agents. These structured polymers possess molecular structure that is branched, cross-linked or some combination thereof, as opposed to polymers that possess linear molecular structure. The structured polymers of this invention have improved capability for inhibiting the formation, precipitation or deposition of scale, improved capability of dispersing insoluble precipitates in aqueous systems, improved capability in treating cooling and boiler water, and improved capability to reduce the viscosity of mineral slurries compared to existing polymers.

It is a principal object of this invention to provide polymer compositions having a molecular weight of less than about 500,000 comprising at least one unsaturated organic monomer or salts thereof, and at least one structure-inducing agent.

Other objects of this invention are to provide: methods for inhibiting scale formation, precipitation or deposition in an aqueous medium comprising the step of adding to said aqueous medium an effective amount of a polymer composition comprising at least one unsaturated organic monomer and at least one structure-inducing agent; methods for increasing dispersion of insoluble precipitates in process waters comprising the step of adding to said process waters an effective amount of a polymer composition comprising at least one unsaturated organic monomer and at least one structure-inducing agent; methods of treating cooling and boiler water comprising the step of adding to said cooling and boiler water an effective amount of a polymer composition comprising at least one unsaturated organic monomer and at least one structure-inducing agent; and methods of reducing the viscosity of a mineral slurry comprising the step of adding to said slurry an effective amount of the polymer composition comprising at least one unsaturated organic monomer and at least one structure-inducing agent.

DETAILED DESCRIPTION OF THE INVENTION

In order that the invention herein described may be more fully understood, the following detailed description is set forth. In the description, the following abbreviations are used:

| Designation | Reagent or Fragment |
|---|---|
| AA | acrylic acid |
| AM | acrylamide |
| AMPS | 2-acrylamido-2-methylpropane sulfonic acid |
| COM. | commercial |
| DADMAC | diallyldimethylammonium chloride |
| EDTA | ethylenediaminetetraacetic acid |
| GPC | gel permeation chromatography |
| MA | methyl acrylate |
| MAn | maleic anhydride |
| MBA | methylenebisacrylamide |
| MBS | sodium metabisulfite |
| ME | 2-mercaptoethanol |
| NVP | N-vinylpyrrolidone |
| PAA | polyacrylic acid |
| SAHS | sodium allyloxy-2-hydroxypropylsulfonate |
| T-BAM | t-butylacrylamide |

The following terms are employed herein:

The term "branching" refers to the creation of branches or additional termini relative to the two original termini that exist in linear entities.

The term "branching agent" refers to an agent which causes branching to occur.

The term "cross-link" refers to an interconnection between polymer chains.

The term "cross-linking agent" refers to an agent which induces cross-linking, branching or a combination thereof to occur.

The term "ethylenically unsaturated" refers to the presence of at least one unsaturated ethylenic group.

The term "interpolymer" refers to a polymer formed from three or more different monomers.

The term "monomer" refers to single, discreet molecule which is capable of combining to form polymers.

The term "structured polymer" refers to a polymer prepared with incorporation of a structure-inducing agent.

The term "structure-inducing agent" refers to an agent which, when added to a polymer composition, induces branching, cross-linking or a combination thereof.

In view of the above definitions, other terms of chemical and polymer technology used throughout this application can be easily understood by those of skill in the art. Terms may be used alone or in any combination thereof.

This invention provides a polymer composition having a molecular weight of less than about 500,000 comprising at least one unsaturated organic monomer or salts thereof, and at least one structure-inducing agent.

In a preferred embodiment of this invention, each unsaturated organic monomer is independently selected from the group consisting of monoethylenically unsaturated carboxylic acids, monoethylenically unsaturated carboxylic acid anhydrides, monoethylenically unsaturated sulfonic acids, and sulfonated styrene. More preferably, each unsaturated organic monomer is independently selected from the group consisting of acrylic acid, methacrylic acid, maleic acid, maleic anhydride, 2-acrylamido-2-methylpropane sulfonic acid, 2-methacrylamido-2-methylpropane sulfonic acid, and allyloxy-2-hydroxypropyl sulfonic acid.

In another preferred embodiment of this invention, the structure-inducing agent is a crosslinking or branching agent. More preferably, the structure-inducing agent is independently selected from the group consisting of polyunsaturated acrylic amides, polyunsaturated acrylic esters, alkenyl-substituted heterocycles, tri- or tetra-allylic quaternary ammonium halides, and aldehydes. Even more preferably, the structure-inducing agent is independently selected from the group consisting of methylenebisacrylamide, triallylmethylammonium chloride, ethylene glycol diacrylate, glyoxal and formaldehyde.

In a further embodiment, this invention provides a polymer composition having a molecular weight of less than about 500,000 comprising a copolymer of unsaturated organic monomers and a structure-inducing agent.

In a preferred embodiment of this invention, the copolymer comprises unsaturated organic monomers independently selected from the group consisting of monoethylenically unsaturated carboxylic acids, monoethylenically unsaturated carboxylic acid anhydrides, monoethylenically unsaturated sulfonic acids and sulfonated styrene. More preferably, the copolymer comprises unsaturated organic monomers independently selected from the group consisting of acrylic acid, methacrylic acid, maleic acid, maleic anhydride, 2-acrylamido-2-methylpropane sulfonic acid, 2-methacrylamido-2-methylpropane sulfonic acid and allyloxy-2-hydroxypropyl sulfonic acid.

In another embodiment, the copolymer comprises one unsaturated organic monomer independently selected from the group consisting of monoethylenically unsaturated carboxylic acids, monoethylenically unsaturated carboxylic acid anhydrides, monoethylenically unsaturated sulfonic acids and sulfonated styrene; and one unsaturated organic monomer selected from the group consisting of unsaturated acrylic amides, unsaturated acrylic esters, alkenyl-substituted heterocycles and unsaturated quaternary ammonium halides. More preferably, the copolymer comprises an unsaturated organic monomer selected from the group consisting of acrylic acid, methacrylic acid, maleic acid, maleic anhydride, 2-acrylamido-2-methylpropane sulfonic acid, 2-methacrylamido-2-methylpropane sulfonic acid, allyloxy-2-hydroxypropyl sulfonic acid and sulfonated styrene; and an unsaturated organic monomer selected from the group consisting of acrylamide, substituted acrylamides, N-vinylpyrrolidone, methacrylate, ethylacrylate, and diallylic quaternary ammonium halides.

In another embodiment, this invention provides a polymer composition having a molecular weight of less than about 500,000 comprising an interpolymer of unsaturated organic monomers and a structure-inducing agent.

In a preferred embodiment, the interpolymer comprises at least one unsaturated organic monomer independently selected from the group consisting of monoethylenically unsaturated carboxylic acids, monoethylenically unsaturated carboxylic acid anhydrides, monoethylenically unsaturated sulfonic acids and sulfonated styrene; and additional unsaturated organic monomers independently selected from the group consisting of monoethylenically unsaturated carboxylic acids, monoethylenically unsaturated carboxylic acid anhydrides, monoethylenically unsaturated sulfonic acids, sulfonated styrene, unsaturated acrylic amides, unsaturated acrylic esters, alkenyl-substituted heterocycles and unsaturated quaternary ammonium halides.

More preferably, at least one unsaturated organic monomer is independently selected from the group consisting of acrylic acid, methacrylic acid, maleic acid, maleic anhydride, 2-acrylamido-2-methylpropane sulfonic acid, 2-methacrylamido-2-methylpropane sulfonic acid, allyloxy-2-hydroxypropyl sulfonic acid and sulfonated styrene; and additional unsaturated organic monomers are independently selected from the group consisting of acrylic acid, methacrylic acid, maleic acid, maleic anhydride, 2-acrylamido-2-methylpropane sulfonic acid, 2-methacrylamido-2-methylpropane sulfonic acid, allyloxy-2-hydroxypropyl sulfonic acid, acrylamide, substituted acrylamides, N-vinylpyrrolidone, methacrylate, ethylacrylate, and diallylic quaternary ammonium halides.

In an alternate embodiment, this invention provides a polymer composition having a molecular weight of less than about 500,000 comprising at least one unsaturated organic monomer or salts thereof, and at least one structure-inducing agent, wherein unsaturated organic monomers independently selected from the group consisting of monoethylenically unsaturated carboxylic acids, monoethylenically unsaturated carboxylic acid anhydrides, monoethylenically unsaturated sulfonic acids and sulfonated styrene comprise between about 50% and about 100% of the total composition and more preferably between about 70% and about 100% of the total composition.

In a further embodiment, this invention provides a polymer composition having a molecular weight of less than about 500,000 comprising at least one unsaturated organic monomer or salts thereof, and at least one structure-inducing agent, wherein the molecular weight of the polymer is less than 100,000 amu, and more preferably less than 50,000 amu.

In another embodiment, this invention provides a polymer composition having a molecular weight of less than about 500,000 comprising at least one unsaturated organic monomer or salts thereof, and at least one structure-inducing agent, wherein the concentration of structure-inducing agent is between about 50 and about 20,000 ppm.

In an alternate embodiment, this invention provides methods for inhibiting scale formation, precipitation or deposition in an aqueous medium; for increasing dispersion of insoluble precipitates in process waters; and for treating cooling and boiler water; comprising the step of adding to said aqueous medium, process waters and cooling and boiler water an effective amount of a polymer composition having a molecular weight of less than about 500,000 comprising at least one unsaturated organic monomer and at least one structure-inducing agent.

In another embodiment, this invention provides a method of reducing the viscosity of a mineral slurry comprising the step of adding to said slurry an effective amount of the polymer composition having a molecular weight of less than about 500,000 comprising at least one unsaturated organic monomer and at least one structure-inducing agent. In a preferred embodiment, the mineral slurry comprises one or more minerals selected from the group consisting of calcium carbonate, titanium dioxide, coal, calcined kaolin clay and hydrated kaolin clay. In an alternate preferred embodiment the mineral slurry comprises at least one metal, preferably a transition metal.

In alternate preferred embodiments, this invention includes the methods described above wherein the polymer composition comprises the preferred, more preferred and even more preferred polymer compositions described above.

The structured polymers described herein can be prepared by conventional polymerization techniques well-known to those skilled in the art. Such techniques include, but are not limited to, solution polymerization, reverse-phase emulsion polymerization and suspension polymerization. Polymerization may be initiated via a free radical initiator. The preferred initiator method is free radical, however, photochemical or radiation methods may also be utilized. The introduction of the structure-inducing agent may be performed either prior to, concurrent with or after combining the other agents necessary for formation of the structured polymers of this invention.

Where carboxylic acids, or their salts thereof, are used for the preparation of compositions of this invention, it is also envisioned that esters, amides or nitriles may be hydrolyzed to give the desired carboxylic acid. This hydrolysis may occur before or after a polymerization event.

In order to obtain the low molecular weight polymers of this invention, it is necessary to use a chain transfer agent in their preparation. Examples of chain transfer agents which may be used are well-known to those skilled in the art. They include, but are not limited to, agents such as alcohols, phosphates, phosphinic acids, sulfites, mercaptans, and thioacids. The amount of chain transfer agent necessary will be influenced by factors such as efficiency of the compound, the monomer mixture used, the amount of structure-inducing agent present and the desired molecular weight of the final product. A combination of two or more chain transfer agents may be used in one formulation.

In order that this invention be more fully understood, the following examples are set forth. These examples are for the purposes of illustration and are not to be construed as limiting the scope of the invention in any way.

EXAMPLES

Example 1

Copolymers containing 40 weight % AMPS/60 weight % AA and 20 weight % AMPS/80 weight % AA, neutralized to pH 3.5–6.0 with sodium hydroxide, were prepared via aqueous solution polymerization. Ammonium persulfate and sodium metabisulfite were used as the initiator/chain transfer system. The formulations contained 0–5000 ppm MBA as the structure inducing agent. The final products were between 30% and 40% active as acid. Specific data, including molecular weight as determined by GPC, are detailed in Table 1.

TABLE 1

| SAMPLE | COMPOSITION | PPM MBA | MW |
|--------|-------------|---------|--------|
| 1A | 40/60 AMPS/AA | 0 | 25,900 |
| 1B | 40/60 AMPS/AA | 100 | 18,100 |
| 1C | 20/80 AMPS/AA | 0 | 14,100 |
| 1D | 20/80 AMPS/AA | 5000 | 87,100 |
| 1E | 20/80 AMPS/AA | 0 | 19,300 |
| 1F | 20/80 AMPS/AA | 1000 | 18,200 |
| 1G | 20/80 AMPS/AA | 0 | 7,400 |
| 1H | 20/80 AMPS/AA | 1000 | 4,940 |
| 1I | 20/80 AMPS/AA | 5000 | 6,400 |

Example 2

Homopolymers of polyacrylic acid were prepared by the same method described in Example 1 without neutralization. Polymer formulations contained from 0–20,000 ppm MBA as the structure inducing agent. In some cases 2-mercaptoethanol (ME) was used in conjunction with sodium metabisulfite (MBS) as the chain transfer system. Specific data are given in Table 2.

TABLE 2

| SAMPLE | CHAIN TRANSFER | PPM MBA | MOLECULAR WEIGHT |
|---|---|---|---|
| 2A | MBS | 500 | — |
| 2B | MBS | 1,000 | 57,000 |
| 2C | MBS | 1,000 | 65,600 |
| 2D | MBS/2ME | 1,250 | 7,400 |
| 2E | MBS/2ME | 2,500 | 8,800 |
| 2F | MBS/2ME | 5,000 | 11,000 |
| 2G | MBS/2ME | 5,000 | — |
| 2H | MBS/2ME | 10,000 | — |
| 2I | MBS/2ME | 15,000 | — |
| 2J | MBS/2ME | 20,000 | — |
| 2K | MBS/2ME | 15,000 | — |
| 2L | MBS/2ME | 5,000 | — |
| 2M | MBS/2ME | 5,000 | — |

Example 3

A series of homo-, co- and terpolymers were prepared with other carboxylic acids, sulfonic acids and several co- and terpolymers were prepared incorporating cationic and nonionic molecules in the polymer composition. All polymers were prepared according to Example 1 and adding 0 to 5000 ppm MBA as the structure inducing agent. Specific data are given in Table 3. All polymers shown in Table 3 were prepared to achieve a desired molecular weight below 15,000.

TABLE 3

| SAMPLE | COMPOSITION | PPM MBA |
|---|---|---|
| 3A | 60/20/20 AA/AMPS/DADMAC | 0 |
| 3B | 60/20/20 AA/AMPS/DADMAC | 5000 |
| 3C | 70/20/10 AA/AMPS/NVP | 0 |
| 3D | 70/20/10 AA/AMPS/NVP | 5000 |
| 3E | 80/20 AA/SAHS | 0 |
| 3F | 80/20 AA/SAHS | 5000 |
| 3G | 70/20/10 AA/AMPS/AM | 0 |
| 3H | 70/20/10 AA/AMPS/AM | 5000 |
| 3I | 80/20 AA/AM | 0 |
| 3J | 80/20 AA/AM | 5000 |
| 3K | 70/20/10 AA/AMPS/MA | 0 |
| 3L | 70/20/10 AA/AMPS/MA | 5000 |
| 3M | 80/20 AA/MA | 0 |
| 3N | 80/20 AA/MA | 5000 |
| 3O | HOMOPOLYMER AMPS | 0 |
| 3P | HOMOPOLYMER AMPS | 5000 |
| 3Q | 70/20/10 AA/AMPS/TBAM | 0 |
| 3R | 70/20/10 AA/AMPS/TBAM | 5000 |
| 3S | HOMOPOLYMER MAn | 0 |
| 3T | HOMOPOLYMER MAn | 5000 |

Examples 4–13

All of the samples described in Examples 1–3 were tested for performance in a variety of applications. The samples described in Examples 1–3 also were tested against commercially available materials that are presently used for these applications. Molecular weights were measured on the commercial products by GPC using the same method as was used for the laboratory samples described in the examples. As different methods of analysis can produce a variation in the result, molecular weights on all materials were measured by the same procedure. Data on these commercial products is detailed in Table 4.

TABLE 4

| SAMPLE | COMPOSITION | MW |
|---|---|---|
| 4A | COM. AA/AMPS | 28,700 |
| 4B | COM. AA/AMPS | 8,100 |
| 4C | COM. PAA | 3,730 |
| 4D | POLYACRYLATE (COM) | 5,400 |
| 4E | POLYACRYLATE (COM) | 3,900 |
| 4F | POLYACRYLATE (COM) | 4,500 |

Example 4

Calcium Carbonate Inhibition

| SET 1 - 70° C., 1 PPM POLYMER DOSAGE | | | | |
|---|---|---|---|---|
| SAMPLE | POLYMER | PPM MBA | MW | % INHIBITION |
| 1A | 60/40 AA/AMPS | 0 | 25,900 | 36.7 |
| 1B | 60/40 AA/AMPS | 100 | 18,100 | 42.2 |
| 1C | 80/20 AA/AMPS | 0 | 14,100 | 40.4 |
| 1D | 80/20 AA/AMPS | 5000 | 87,100 | 48.6 |
| 4C | 100% AA (COM) | 0 | 3,730 | 9.2 |
| 2C | 100% AA | 1000 | 65,600 | 46.8 |
| SET 2 - 70° C., 1 PPM POLYMER DOSAGE | | | | |
| 4C | 100% AA (COM) | 0 | 3,730 | 39.8 |
| 2A | 100% AA | 500 | — | 52.7 |
| 2F | 100% AA | 5000 | 11,000 | 52.7 |
| SET 3 - 70° C. | | | | |
| SAMPLE | POLYMER | PPM MBA | MW | DOSE | % INHIBITION |
| 1G | 80/20 AA/AMPS | 0 | 7400 | 1 PPM | 35.9 |
| 1I | 80/20 AA/AMPS | 5000 | 6400 | 1 PPM | 56.8 |
| 1G | 80/20 AA/AMPS | 0 | 7400 | 4 PPM | 63.0 |
| 1I | 80/20 AA/AMPS | 5000 | 6400 | 4 PPM | 80.7 |
| 4B | COM. AA/AMPS | 0 | 8100 | 4 PPM | 64.9 |

| SET 4 - 80° C., 2.5 PPM POLYMER DOSAGE | | | | |
|---|---|---|---|---|
| SAMPLE | POLYMER | PPM MBA | MW | % INHIBITION |
| 1G | 80/20 AA/AMPS | 0 | 7,400 | 44.9 |
| 1I | 80/20 AA/AMPS | 5000 | 6,400 | 57.6 |
| 4B | COM. AA/AMPS | 0 | 8,100 | 29.7 |

| SET 5 - 70° C., 1 PPM POLYMER DOSAGE | | | |
|---|---|---|---|
| SAMPLE | POLYMER | PPM MBA | % INHIBITION |
| 1G | 80/20 AA/AMPS | 0 | 61.1 |
| 1I | 80/20 AA/AMPS | 5000 | 77.9 |
| 4B | COM. AA/AMPS | 0 | 58.9 |
| 3A | 60/20/20 AA/AMPS/DADMAC | 0 | 53.3 |
| 3B | 60/20/20 AA/AMPS/DADMAC | 5000 | 62.2 |
| 3C | 70/20/10 AA/AMPS/NVP | 0 | 61.1 |
| 3D | 70/20/10 AA/AMPS/NVP | 5000 | 68.9 |
| 1G | 80/20 AA/AMPS | 0 | 47.4 |
| 1I | 80/20 AA/AMPS | 5000 | 61.9 |
| 4B | COM. AA/AMPS | 0 | 43.3 |
| 3E | 80/20 AA/SAHS | 0 | 34.0 |
| 3F | 80/20 AA/SAHS | 5000 | 45.4 |
| 3G | 70/20/10 AA/AMPS/AM | 0 | 42.3 |
| 3H | 70/20/10 AA/AMPS/AM | 5000 | 55.7 |
| 3I | 80/20 AA/AM | 0 | 26.8 |
| 3J | 80/20 AA/AM | 5000 | 35.1 |
| 3K | 70/20/10 AA/AMPS/MA | 0 | 32.0 |
| 3L | 80/20/10 AA/AMPS/MA | 5000 | 41.2 |
| 3M | 80/20 AA/MA | 0 | 24.7 |
| 3N | 80/20 AA/MA | 5000 | 33.0 |
| 3O | 100% AMPS | 0 | 18.6 |
| 3P | 100% AMPS | 5000 | 25.8 |
| 3Q | 70/20/10 AA/AMPS/TBAM | 0 | 39.1 |
| 3R | 70/20/10 AA/AMPS/TBAM | 5000 | 47.8 |
| 3S | HOMOPOLYMER MAn | 0 | 22.8 |
| 3T | HOMOPOLYMER MAn | 5000 | 31.5 |

Calcium Carbonate Inhibition Test Procedure

All tests for calcium carbonate inhibition were conducted according to the following procedure:
1. Add 50 ml 0.023 M calcium stock solution (prepared from $CaCl_2$ and neutralized to pH 8.5) to glass vessel.
2. Add 0 (control), 0.1, 0.25 or 0.5 ml of 1 g/l active polymer solution (neutralized to pH 8) 1, 2.5 and 5 ppm respectively, to vessel.
3. Add 50 ml 0.023 M carbonate stock solution (prepared from $Na_2CO_3$ and neutralized to pH 8.5) to vessel.
4. Cap vessel and shake to mix.
5. Place jars in forced air oven set at required temperature (70 or 80° C.) for 17 hrs. After approximately 60 minutes, loosen cap and recap to release pressure.
6. After 17 hrs., remove from oven and let cool to room temperature.
7. Filter through 0.45 micron filter.
8. Add 25 ml of filtered solution to beaker with 25 ml of water.
9. Add 3 ml of water hardness buffer solution and calcium indicator.
10. Titrate with 0.01 M EDTA solution.
11. % Inhibition =

$$\frac{ml\,EDTA(sample) - ml\,EDTA(control)}{ml\,EDTA(titration\,control) - ml\,EDTA(control)} \times 100\%$$

where titration control=50 ml calcium stock solution+50 ml water prepared fresh prior to titration; EDTA (control)=0 ppm polymer Example 5

Calcium Phosphate Inhibition 10 ppm Polymer, pH 9.5, 70° C.

| SAMPLE | POLYMER | PPM MBA | MW | % INHIBITION |
|---|---|---|---|---|
| 1G | 80/20 AA/AMPS | 0 | 7,400 | 81.0 |
| 1H | 80/20 AA/AMPS | 1000 | 4,940 | 90.1 |
| 1I | 80/20 AA/AMPS | 5000 | 6,400 | 95.0 |
| 1D | 80/20 AA/AMPS | 5000 | 87,100 | 94.6 |
| 4B | COM. AA/AMPS | 0 | 8,100 | 81.3 |

Calcium Phosphate Inhibition Test Procedure

All tests for calcium phosphate inhibition were conducted according to the following procedure:

1. Add 50 ml of 12 ppm $PO_4$ stock solution to glass vessel.
2. Add desired polymer dose (1, 5, or 10 ppm) to vessel.
3. Add 50 ml 500 ppm calcium stock solution containing 5 ppm $Fe^{+2}$.
4. Adjust samples to desired pH (9.5)
5. Cap and place in 70° C. forced air oven for 17 hrs.
6. After approximately 60 minutes, release pressure in vessels.

7. Remove from oven and filter immediately through 0.22 micron filter.
8. Analyze for PO$_4$ by ascorbic acid method.

9. % Inhibition =

$$\frac{\% \text{ Phosphate sample} - \% \text{ PhosphateControl}}{\% \text{ PhosphateTitration Control} - \% \text{ Phosphate Control}} \times 100\%$$

Example 6

Calcium Sulfate Inhibition pH 8.5, 70° C., 72 hrs

| SAMPLE | POLYMER | PPM MBA | MW | DOSE | % INHIBITION |
|---|---|---|---|---|---|
| 4C | 100% AA (COM) | 0 | 3730 | .1 PPM | 0 |
| 2G | 100% AA | 5000 | 11,000 | .1 PPM | 8.2 |
| 2A | 100% AA | 500 | | .1 PPM | 8.2 |
| 4B | COM. AA/AMPS | 0 | 8100 | .1 PPM | 5.5 |
| 1I | 80/20 AA/AMPS | 5000 | 6400 | .1 PPM | 10.9 |
| 4B | COM. AA/AMPS | 0 | 8100 | .5 PPM | 24.7 |
| 1G | 80/20 AA/AMPS | 0 | 7400 | .5 PPM | 28.7 |
| 1I | 80/20 AA/AMPS | 5000 | 6400 | .5 PPM | 35.6 |

4. Place in 70° C. forced air oven for 72 hrs. Release pressure after 1 hr.
5. Cool to room temperature
6. Filter through 0.22 micron filter
7. Titrate for calcium with EDTA.

8. % Inhibition =

$$\frac{\text{ml EDTA(sample)} - \text{ml EDTA(control)}}{\text{ml EDTA(titration control)} - \text{ml EDTA(control)}} \times 100\%$$

where titration control=50 ml calcium stock solution+50 ml water prepared fresh prior to titration; EDTA (control)=0 ppm polymer Example 7

Iron Oxide Dispersion

| | | SET 1 | | | | |
|---|---|---|---|---|---|---|
| SAMPLE | POLYMER | DOSAGE | PPM MBA | % T 1 hr | % T 2 hr | % T 3 hr |
| CONTROL | NONE | 0 | | 43.7 | 54.2 | 67.0 |
| 1E | 60/20 AA/AMPS | 10 PPM | 0 | 41.4 | 43.8 | 49.2 |
| 1F | 80/20 AA/AMPS | 10 PPM | 1000 | 34.3 | 36.9 | 40.2 |
| | | SET 2 | | | | |
| SAMPLE | POLYMER | DOSAGE | PPM MBA | % T 1 hr | | |
| CONTROL | NONE | 0 | | 59.4 | | |
| 1C | 80/20 AA/AMPS | 0 | 0 | 38.1 | | |
| 1D | 80/20 AA/AMPS | 1 PPM | 5000 | 34.3 | | |
| 4A | COM. AA/AMPS | 1 PPM | 0 | 42.4 | | |
| | | SET 3 | | | | |
| CONTROL | NONE | 0 | | 59.4 | | |
| 4C | COM. AA | 10 PPM | 0 | 52.0 | | |
| 2B | AA | 10 PPM | 1000 | 43.4 | | |
| 2C | AA | 10 PPM | 1000 | 46.8 | | |

Calcium Sulfate Test Procedure

All tests for calcium sulfate inhibition were conducted according to the following procedure:

1. Add 50 ml 15.3 g/l solution of calcium chloride (pH 8.5) to glass vessel.
2. Add desired polymer dose (0.1 or 0.5 ppm) to vessel.
3. Add 50 ml 8.1 g/l sodium sulfate solution (pH 8.5) to vessel.

Iron Oxide Inhibition Test Procedure

All tests for iron oxide inhibition were conducted according to the following procedure:
1. Prepare 200 ppm suspension of iron oxide in the presence of 250 ppm calcium.
2. Mix for 30 minutes.
3. Place 100 ml aliquots into glass vessels.
4. Add polymer at desired concentration.
5. Agitate samples for 15 minutes.
6. Let stand for desired time period.
7. Pipet 10 ml aliquot from top and measure % transmittance with a spectrophotometer at 720 nm.

8. The lower the % transmittance, the greater dispersion capability.

Example 8

| SAMPLE | POLYMER | DOSAGE | PPM MBA | %T 2.5 hr |
|---|---|---|---|---|
| CONTROL | NONE | 0 | | 39.8 |
| 4C | COM. AA | 10 PPM | 0 | 35.4 |
| 2C | AA | 10 PPM | 1000 | 31.5 |
| 1C | 80/20AA/AMPS | 10 PPM | 0 | 10.3 |
| 1D | 80/20AA/AMPS | 10 PPM | 5000 | 6.8 |
| 1F | 80/20AA/AMPS | 10 PPM | 1000 | 7.7 |

Clay Dispersion Procedure

All tests for clay dispersion were conducted as in the iron oxide test procedure except that a 1000 ppm clay suspension was prepared in the presence of 250 ppm calcium.

Examples 4–8 demonstrate that the polymer compositions of this invention possess enhanced capability to inhibit scale formation, precipitation or deposition, and provide increased dispersion of insoluble particulates in process waters.

Example 9

Calcium Carbonate Viscosity Reduction—70% Slurry

Two structured sodium polyacrylate polymers were evaluated against a commercially available dispersant commonly used in this application, according to the following procedure:
1. Add the following to a 400 ml beaker:
   a. 100 ml water,
   b. 4.5 ml 10% active polymer solution, and
   c. Add 250 g calcium carbonate slowly while mixing.
2. After all calcium carbonate is added, mix at high speed for 15 minutes.
3. Pour into an 8 oz jar.
4. Measure viscosity with Brookfield viscometer, Model RVF, at 20 rpm.
5. Add additional polymer in 4.5 ml increments, upon each addition repeat step 2 for 5 minutes then repeat step 4.

| SAMPLE | PPM MBA | MW | DOSAGE | VISCOSITY (CPS) |
|---|---|---|---|---|
| 4C | 0 | 3,730 | 4.5 ml | — |
| | | | 9.0 ml | 48,740 |
| | | | 13.5 ml | 6,620 |
| | | | 18.0 ml | 5,790 |
| | | | 22.5 ml | 5,950 |
| 2D | 1250 | 7,400 | 4.5 ml | — |
| | | | 9.0 ml | 35,960 |
| | | | 13.5 ml | 2,980 |
| | | | 18.0 ml | 3,560 |
| 2F | 5000 | 11,000 | 4.5 ml | — |
| | | | 9.0 ml | 42,350 |
| | | | 13.5 ml | 3,750 |
| | | | 18.0 ml | 4,230 |

Example 10

Kaolin Clay Viscosity Reduction—70% Slurry

A series of 80/20 AA/AMPS copolymers were evaluated as dispersants for a 70% slurry of kaolin clay. The test procedure used was identical to the procedure of Example 9 except that, 10% active polymer and 10% active sodium carbonate were added in 10 ml increments. Performance was measured with a Brookfield viscometer, Model RVF, at 20 rpm.

| SAMPLE | PPM MBA | MW | DOSAGE | VISCOSITY (CPS) |
|---|---|---|---|---|
| 1E | 0 | 19,300 | 1.5 ml | 1265 |
| | | | 2.0 ml | 860 |
| | | | 2.5 ml | 865 |
| 1F | 1000 | 18,200 | 1.5 ml | 925 |
| | | | 2.0 ml | 750 |
| | | | 2.5 ml | 740 |

Example 11

Kaolin Clay Viscosity Reduction—70% Slurry

| SAMPLE | PPM MBA | MW | DOSAGE (LB/TON) | VISCOSITY (CPS) BROOKFIELD | VISCOSITY (DN-cm X10$^5$) HERCULES |
|---|---|---|---|---|---|
| | | | | | Measured at 1100 rpm |
| 4F | 0 | 4,500 | 3.25 | 830 | |
| | | | 3.50 | 484 | |
| | | | 3.75 | 283 | |
| | | | 4.00 | 270 | 7.2 |
| 2D | 1,250 | 7,400 | 2.75 | 768 | |
| | | | 3.00 | 350 | |
| | | | 3.25 | 297 | |
| | | | 3.50 | 340 | 4.8 |
| 2F | 5,000 | 11,000 | 2.75 | 430 | |
| | | | 3.00 | 470 | 5.9 |
| | | | | | Measured at 4400 rpm |
| 4F | 0 | 4,500 | 3.00 | 752 | |
| | | | 3.25 | 163 | 42.0 |
| 2K | 15,000 | — | 3.00 | 1057 | |
| | | | 3.25 | 255 | 28.0 |

The above tests were conducted using hydrated mid-Georgia kaolin clay.

Example 12

Kaolin Clay Viscosity Reduction—70% Slurry

| SAMPLE | PPM MBA | MW | DOSAGE (LB/TON) | VISCOSITY (CPS) BROOKFIELD | VISCOSITY (DN-cm X10$^5$) HERCULES |
|---|---|---|---|---|---|
| | | | | | Measured at 4400 rpm |
| 4F | 0 | 4,500 | 2.5 | 250 | 3.8 |
| 2D | 1250 | 7400 | 2.5 | 320 | 2.7 |
| 2L | 5000 | — | 3.0 | 250 | 2.8 |
| 2M | 5000 | — | 3.0 | 360 | 3.2 |

The above example was conducted using Eastern Georgia clay, which generally is finer in particle size than mid-Georgia kaolin clay.

Example 13

Calcined Kaolin Viscosity Reduction—50% Slurry

CALCINED KAOLIN VISCOSITY REDUCTION - 50% SLURRY

| SAMPLE | PPM MBA | MW | DOSAGE LB./TON | VISCOSITY HERCULES (Cps) | MAX. RPM ACHIEVED at 16 dyne-cm X10$^5$ |
|---|---|---|---|---|---|
| 4F | 0 | 4500 | 2.0 | 784 | 780 |
|  |  |  | 2.5 | 779 | 785 |
| 2D | 1250 | 7400 | 2.0 | 679 | 900 |
|  |  |  | 2.5 | 611 | 1000 |
| 2K | 15,000 |  | 2.0 | 799 | 765 |
|  |  |  | 2.5 | 593 | 1030 |

The Hercules viscosity data shown in Example 13 give both a Hercules viscosity number in dynes and an rpm reading. The procedures for evaluating both hydrated and calcined kaolin slurries are given below:

The 70% hydrated kaolin slurry used in Examples 11–13 were prepared as follows:

1. Prepare solutions of 10% active polymer and 10% active sodium carbonate.
2. Weigh out 500 g clay.
3. Weigh 200 g water into vessel for high speed mixer.
4. Add 2 pounds/ton active sodium carbonate.
5. Add 2 pounds/ton active polymer.
6. Mix until homogeneous and then add clay to vessel while mixing at as high a speed as possible.
7. If mixture is not fluid, add additional polymer and sodium carbonate at equal concentrations. Mix for 1 minute at high speed.
8. After all clay is added check pH of slurry (should be between 6.5–7.5).
9. Check % solids (should be approximately 70.2%)
10. Check Brookfield viscosity with Model RVF spindle 1 or 2 at 20 rpm.
11. Record viscosity—Add additional 0.25 pounds/ton until optimum is reached (add 0.25 pounds/ton of sodium carbonate along with polymer).
12. Take Hercules viscosity on final sample at either 1100 or 4400 rpm, using B Bob.

The 50% calcined kaolin slurry used in Example 14 was prepared as follows:

1. Weigh out 300 g calcined kaolin.
2. Weigh 288.5 g water into vessel for low sheer mixer.
3. Add 1.5 g each of 10% active dispersant solution and 10% active sodium carbonate solution.
4. Mix until homogeneous.
5. Add clay to water mixture slowly.
6. After all clay is added, mix at high speed for 1 minute.
7. Measure pH and % solids (pH should be 6.5–7.5 and % solids should be approximately 50%).
8. Take Hercules viscosity at 1100 rpm, using B Bob.

Examples 9–13, described above, demonstrate that the polymer compositions of this invention possess enhanced capability to reduce the viscosity of mineral slurries compared to existing technology.

While described herein are a number of embodiments of this invention, it is apparent that the basic constructions may be altered to provide other embodiments which utilize the products of this invention. Therefore, it will be appreciated that the scope of this invention is to be defined by the appended claims, rather than by the specific embodiments which have been presented by way of example.

I claim:

1. A dispersant polymer composition having a molecular weight of less than about 50,000 comprising:

at least one unsaturated organic monomer or salts thereof, wherein each unsaturated organic monomer is independently selected from the group consisting of monoethylenically unsaturated carboxylic acids, monoethylenically unsaturated carboxylic acid anhydrides, monoethylenically unsaturated sulfonic acids, and sulfonated styrene; and at least one structure-inducing agent.

2. The dispersant polymer composition according to claim 1, wherein each unsaturated organic monomer is independently selected from the group consisting of acrylic acid, methacrylic acid, maleic acid, maleic anhydride, 2-acrylamido-2-methylpropane sulfonic acid, 2-methacrylamido-2-methylpropane sulfonic acid, and allyloxy-2-hydroxypropyl sulfonic acid.

3. The dispersant polymer composition according to claim 1, wherein the structure-inducing agent is a crosslinking or branching agent.

4. The dispersant polymer composition according to claim 3, wherein the structure-inducing agent is independently selected from the group consisting of polyunsaturated acrylic amides, polyunsaturated acrylic esters, alkenyl-substituted heterocycles, triallylic or tetraallylic quaternary ammonium halides, and aldehydes.

5. The dispersant polymer composition according to claim 4, wherein the structure-inducing agent is independently selected from the group consisting of methylenebisacrylamide, triallylmethylammonium chloride, ethylene glycol diacrylate, glyoxal and formaldehyde.

6. The dispersant polymer composition according to claim 1, wherein the concentration of structure-inducing agent is between about 50 and about 20,000 ppm.

* * * * *

UNITED STATES PATENT AND TRADEMARK OFFICE
CERTIFICATE OF CORRECTION

PATENT NO.   : 6,096,847  
DATED        : August 1, 2000  
INVENTOR(S)  : Janice E. LoSasso It is certified that error appears in the above-identified patent and that said Letters Patent is hereby corrected as shown below:

Column 1,  
Line 26, change "scales" to -- scale, --  
Line 40, change "solids" to -- solid --  
Line 62, change "utilzed" to -- utilized --

Column 2,  
Line 2, change "demonstrates" to -- demonstrate --

Column 6,  
Line 12, change "nitrites" to -- nitriles --  
Line 20, change "phosphates," to -- phosphites, --

Column 9,  
Line 62, change "100%" to -- 100 --

Column 11,  
Line 7, change "100%" to -- 100 --

Column 12,  
Line 13, change "100%" to -- 100 --

Column 15,  
Line 23, change "were" to -- was --

Signed and Sealed this

Fifteenth Day of October, 2002

*Attest:*

JAMES E. ROGAN  
*Attesting Officer*  
*Director of the United States Patent and Trademark Office*